(12) United States Patent
Imai et al.

(10) Patent No.: US 7,770,935 B2
(45) Date of Patent: Aug. 10, 2010

(54) THREADED JOINT FOR STEEL PIPES

(75) Inventors: Ryuichi Imai, Wakayama (JP); Kunio Goto, Kobe (JP); Kaoru Takanashi, Fujisawa (JP); Yasuhiro Ogawa, Atsugi (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 582 days.

(21) Appl. No.: 11/329,159

(22) Filed: Jan. 11, 2006

(65) Prior Publication Data
US 2006/0197343 A1 Sep. 7, 2006

Related U.S. Application Data

(60) Provisional application No. 60/643,167, filed on Jan. 13, 2005.

(51) Int. Cl.
*F16L 21/00* (2006.01)
(52) U.S. Cl. .................... 285/94; 285/333; 285/334
(58) Field of Classification Search .................. 285/94, 285/333–334
See application file for complete search history.

(56) References Cited

U.S. PATENT DOCUMENTS

| 3,554,258 | A | | 1/1971 | Duffy | |
|---|---|---|---|---|---|
| 4,871,194 | A | * | 10/1989 | Kawashima et al. | 285/55 |
| 5,906,399 | A | | 5/1999 | Noel | |
| 2003/0066641 | A1 | * | 4/2003 | Yamamoto et al. | 166/242.6 |
| 2003/0094810 | A1 | * | 5/2003 | Goto et al. | 285/94 |
| 2003/0159764 | A1 | * | 8/2003 | Goto | 148/519 |
| 2003/0160446 | A1 | * | 8/2003 | Goto et al. | 285/94 |
| 2004/0113423 | A1 | * | 6/2004 | Dell'Erba et al. | 285/55 |
| 2004/0195825 | A1 | * | 10/2004 | Anraku et al. | 285/94 |
| 2004/0239105 | A1 | * | 12/2004 | Matsumoto et al. | 285/94 |

FOREIGN PATENT DOCUMENTS

| EP | 1 211 451 A1 | 6/2002 |
|---|---|---|
| EP | 1 411 288 A1 | 4/2004 |
| JP | 08-233163 | 9/1996 |
| JP | 08-233164 | 9/1996 |
| JP | 09-072467 | 3/1997 |
| WO | WO 2004/033951 | 4/2004 |

* cited by examiner

*Primary Examiner*—Aaron M Dunwoody
*Assistant Examiner*—Fannie Kee
(74) *Attorney, Agent, or Firm*—Clark & Brody

(57) ABSTRACT

A threaded joint for steel pipes comprises a pin (1) and a box (2) each having a threaded portion (3a or 3b) and an unthreaded metal-to-metal contact portion (4a or 4b) as contact surfaces which contact each other when the joint is fastened. The contact surfaces (3a and 4a and/or 3b and 4b) of at least one of the pin (1) and the box (2) are coated with a lower layer of a solid lubricating coating containing a solid lubricating powder (e.g., molybdenum disulfide, tungsten disulfide, or graphite) and a binder (e.g., an epoxy or other organic resin) and an upper layer of a solid corrosion protective coating formed by an organic resin which does not contain solid particles.

9 Claims, 3 Drawing Sheets

THREADED JOINT FOR STEEL PIPES

CROSS REFERENCE TO RELATED APPLICATIONS

This application claims priority under 35 U.S.C. §119(e) of U.S. Provisional Application No. 60/643,167 filed Jan. 13, 2005.

TECHNICAL FIELD

This invention relates to a threaded joint for steel pipes which can exhibit excellent galling resistance with certainty without being coated with a compound grease which has been applied to threaded joints when connecting OCTG (oil country tubular goods). The threaded joint for steel pipes according to the present invention can avoid the harmful effects on the global environment and on humans caused by compound grease.

BACKGROUND ART

OCTG such as tubing and casing used in the excavation of gas wells and oil wells are usually connected to each other by threaded joints. In the past, the depth of oil wells was generally 2,000-3,000 meters, but in deep oil wells such as recent offshore oil fields, the depth of oil wells reaches 8,000-10,000 meters. In the environment of use, threaded joints for connecting such OCTG are subjected to various forces, such as axial tensile forces caused by the weight of the OCTG and the threaded joints themselves, the combination of internal and external pressures, and geothermal heat. Accordingly, threaded joints used for OCTG need to be able to maintain airtightness without undergoing damage even in such an environment.

A typical threaded joint used for connecting OCTG has a pin-box structure with an externally threaded portion formed on the end portion of a steel pipe (pin) and an internally threaded portion formed on the inner surface of a coupling (box), which is a separate connecting member. An unthreaded metal-to-metal contact portion is formed at the tip of the externally threaded portion of the pin and correspondingly it is also formed at the base of the internally threaded portion of the box. One end of the steel pipe is inserted into the coupling, and the externally threaded portion of the pin and the internally threaded portion of the box are then fastened until the unthreaded metal-to-metal contact portions of these two members are allowed to contact each other, thereby forming a metal seal to guarantee airtightness.

During the process of lowering tubing or casing into a gas or oil well, due to various problems, there are cases in which it is necessary to loosen a threaded joint which has been once fastened to connect two pipes, to lift the pipes and the threaded joint out of the well, to refasten the pipes with the joint, and then relower them. API (American Petroleum Institute) requires a joint that airtightness be maintained without the occurrence of severe seizing referred to as galling even if fastening (makeup) and loosening (breakout) are repeated ten times for a joint for tubing or three times for a joint for casing.

At the time of fastening, in order to increase the resistance to galling and airtightness, a viscous liquid lubricant which contains heavy metal powders and which is referred to as "compound grease" has conventionally been applied to the contact surfaces (namely, the threaded portions and the unthreaded metal-to-metal contact portions) of a threaded joint. Such a compound grease is specified by API Bulletin 5A2.

In the past, it has been proposed to form one or more layers by surface treatment such as nitriding, various types of plating including zinc plating and dispersed plating, and phosphating on the contact surfaces of a threaded joint in order to increase the retention of a compound grease on the contact surfaces and hence improve sliding properties. However, as described below, the use of a compound grease poses the threat of harmful effects on the environment and humans.

Compound grease contains large amounts of powders of heavy metals such as zinc, lead, and copper. When fastening a threaded joint, grease which has been applied is washed off or overflows to the exterior surface, and there is the possibility of the grease causing harmful effects on the environment and especially on sea life, particularly from harmful heavy metals such as lead. In addition, the process of applying a compound grease worsens the working environment, and there is a concern of harmful effects on humans.

In recent years, as a result of the enactment in 1998 of the OSPAR Treaty (Oslo-Paris Treaty) pertaining to preventing ocean pollution in the northeast Atlantic, restrictions concerning the global environment are becoming more strict, and in some countries, the use of compound grease is already restricted. Accordingly, in the excavation of gas wells and oil wells, in order to avoid harmful effects on the environment and humans, there has come to be a demand for threaded joints which can exhibit excellent galling resistance without using compound grease.

Up to now, there have been some proposals of threaded joints which can be used for connection of OCTG in an unlubricated state without application of a compound grease.

For example, JP-A 08-233163, JP-A 08-233164, and JP-A 09-72467 disclose threaded joints having, on the contact surfaces of a threaded joint, a lower phosphate (chemical conversion) coating and an upper solid lubricating coating containing a solid lubricant selected from molybdenum disulfide ($MoS_2$) and tungsten disulfide ($WS_2$) in a resin. The contact surfaces may be subjected, prior to the formation of a phosphate coating, to treatment for increasing the surface roughness or to nitriding treatment.

WO 2004/033951 discloses a threaded joint having a lower layer of a corrosion protective coating and an upper layer of a solid lubricating coating on the contact surfaces of the joint. The corrosion protective coating contains zinc powder in an epoxy resin, and the solid lubricating coating contains molybdenum disulfide ($MoS_2$) or other solid lubricant in an inorganic binder.

However, in each of the above-described threaded joints designed for use in an unlubricated state in the prior art, the solid lubricating coating which is the outermost layer is a coating containing solid lubricant particles in a resin, which, as described below, causes some problems in its actual use.

OCTG are commonly transported by ocean shipping and stored outdoors. In order to prevent corrosion during shipment and storage prior to use, a rust preventive oil (or other liquid designed for rust prevention) is usually applied to the inner and outer surfaces of the pipe. In addition, in order to protect the thread surfaces and the unthreaded metal-to-metal contact portions during shipment and storage, a protector is often mounted on a threaded joint to protect each exposed contact surface of the pin and box of the joint. When a steel pipe for OCTG is shipped in a state in which a coupling is connected to one end of the pipe as shown in FIG. 1, protectors are mounted on the other end of the pipe and on the other end of the coupling.

Even if protectors are installed in this manner, the rust preventive oil which is applied to the inner and outer surfaces of the steel pipe prior to shipment penetrates into the inside of the protector during transport or storage. In addition, the inner and outer surfaces of the steel pipe become wetted by water supplied from condensation of moisture or rainfall during transport and storage, and this water also penetrates in the inside of the protectors. Both the rust preventive oil and water which have penetrated into the inside of the protector come to contact the solid lubricating coating formed as the outermost layer on the contact surfaces of the threaded joint. If installation of a protector is not carried out, such contact occurs more readily.

A solid lubricating coating is formed by particles of a solid lubricant such as molybdenum disulfide or tungsten disulfide dispersed in a binder, so the coating is inherently porous.

Therefore, if a rust preventive oil contacts a solid lubricating coating, it easily permeates into this coating which is porous. As a result, the solid lubricating coating cannot exhibit its function adequately, and there is the possibility of the galling resistance of the threaded joint markedly decreasing. It is conjectured that this is due to a decrease in lubricating performance due to a chemical reaction between the rust preventive oil and the solid lubricant or the binder, or due to an extreme pressure being generated in the rust preventive oil which is confined in the lubricating coating by the pressure which is generated at the time of fastening of a threaded joint, thereby resulting in the breakdown of the bonding of the lubricating coating.

Similarly, the condensed water and rainwater which penetrate into the inside of the protector and come to contact the solid lubricating coating easily permeate into this coating. As a result, there is the possibility of the lubricating properties of the coating decreasing due to a reaction of water with the solid lubricant or of the surface appearance being worsened particularly when the coating contains copper.

These problems caused by a rust preventive oil or water result from the fact that the outermost porous solid lubricating coating is not effectively protected. A corrosion protective coating formed underneath the solid lubricating coating for protection of the steel pipe itself as disclosed in WO 2004/033951 cannot solve these problems.

DISCLOSURE OF THE INVENTION

This invention provides a threaded joint for steel pipes having excellent galling resistance and capable of avoiding worsening of surface appearance. The threaded joint can be used without application of a compound grease having harmful effects on the global environment such as sea life and on humans. The threaded joint does not exhibit a marked decrease in galling resistance even if a rust preventive oil is applied to the inner and outer surfaces of a pipe in order to prevent corrosion during shipment and storage, nor a marked decrease in galling resistance or worsening in appearance even if these surfaces of a pipe are exposed to condensed water or rainwater during shipment and storage.

According to the present invention, by forming a nonporous solid corrosion protective coating which does not contain solid particles atop a solid lubricating coating formed on the contact surfaces of a threaded joint, a threaded joint for steel pipes can be provided which has excellent galling resistance in an unlubricated state (without application of a compound grease) and with no significant decrease in performance during shipment or storage.

A threaded joint for steel pipes according to the present invention comprises a pin and a box having respective contact surfaces which contact each other when the joint is fastened, wherein the contact surfaces of at least one of the pin and the box are coated with a solid lubricating coating comprising a lubricating powder and a binder and with a solid corrosion protective coating which does not contain solid particles formed atop the solid lubricating coating.

In this specification, a pin means a member of a threaded joint having an externally threaded portion, and a box means the other member of a threaded joint having an internally threaded portion which mates with the externally threaded portion of the pin. Typically, both ends of a steel pipe form a pin on their outer surfaces, and both sides of a coupling, which is a separate connecting member, form a box on their inner surfaces. Conversely, it is also theoretically possible for the inner surfaces of both ends of a steel pipe to be a box and for a coupling to be made a pin. In addition, there are also integral threaded joints which can be directly connected to each other without using a coupling and in which one end of a steel pipe forms a pin and the other end thereof forms a box. The present invention can be applied to any of these threaded joints.

In a threaded joint for steel pipes according to the present invention, a nonporous solid corrosion protective coating is formed as the outermost layer. As a result, even if the inner and outer surfaces of a steel pipe are coated with a rust preventive oil or other rust preventive liquid prior to shipment or they are exposed to condensed water or rainwater during shipment and storage, the rust preventive liquid or water is blocked by the outermost solid corrosion protective coating and hence prevented from permeating into the solid lubricating coating formed on the surface of the threaded joint during shipment and storage, thereby avoiding a decrease in lubricating performance and worsening in surface appearance.

At the time of fastening of the threaded joint, the corrosion protective coating gradually wears in the contact portions due to the friction occurring during fastening, and the underlying solid lubricating coating is exposed and can exhibit its lubricating action. Therefore, excellent galling resistance which can prevent the occurrence of galling during repeated fastening and loosening can be achieved in an unlubricated state without using a compound grease. Thus, worsening of the working environment and pollution of the environment, particularly the maritime environment, which accompanies the use of a compound grease which has the possibility of flowing out to the surroundings at the time of its application or at the time of fastening can be prevented. In addition, the process of applying a compound grease in the field becomes unnecessary, so the time required for fastening of OCTG is shortened.

In a threaded joint for steel pipes according to the present invention, the upper layer in the form of a solid corrosion protective coating may consist entirely of an organic resin. Such a solid corrosion protective coating has increased corrosion preventing properties.

The binder used in the solid lubricating coating as the lower layer may be either an inorganic binder (an inorganic polymeric compound) or an organic binder (an organic resin). When the binder of the solid lubricating coating is an organic resin, the solid corrosion protective coating may be entirely or partly formed from the same organic resin used for the binder of the lower layer. This makes it possible to increase the adhesion between the lower solid lubricating coating and the upper solid corrosion protective coating, and the galling resistance of a threaded joint for steel pipes can be further increased.

In a preferred embodiment, a solid lubricating coating and a solid corrosion protective coating are formed on the contact surfaces of the box of a threaded joint. A box is usually formed on a short coupling, so the process of forming a coating on a box can be carried out more easily than on a pin. In addition, this embodiment is more economical compared to forming a solid lubricating coating and a solid corrosion protective coating on both the pin and the box.

When the solid lubricating coating and the solid corrosion protective coating are formed on the contact surfaces of only one member of the pin and the box, the other member may be treated so as to form one or more layers of coating selected from a zinc or zinc alloy coating, a metal plated coating, a phosphate coating, an oxalate coating, a borate coating, and a solid corrosion protective coating on the contact surfaces thereof. By imparting corrosion preventing properties to the other member in this manner, the corrosion preventing properties of the threaded joint for steel pipes can be increased. Alternatively, a solid lubricating coating can be formed on the contact surfaces of the other member to further increase the galling resistance of the threaded joint.

Similarly, when the solid lubricating coating and the solid corrosion protective coating are formed on the contact surfaces of only one of the pin and box, the other member may be treated so as to form either a solid lubricating coating or a solid corrosion protective coating on the contact surfaces thereof after the contact surfaces have been subjected to preparatory surface treatment for surface roughening selected from pickling, blasting, impact plating with zinc or a zinc alloy, metal plating, soft nitriding, composite metal plating, phosphating, oxalate treatment, and borate treatment. Thus, by the so-called anchor effect afforded by surface roughening, the adhesion of the solid lubricating coating or the solid corrosion protective coating to the contact surfaces can be strengthened, and it becomes difficult for peeling of the coating to take place during transport or storage, resulting in a further improvement in the corrosion preventing properties or lubricating properties of a threaded joint for steel pipes.

The contact surfaces of a threaded joint on which the lower solid lubricating coating and the upper nonporous solid corrosion protective coating are formed according to the present invention may also be subjected, prior to the formation of the lower coating, to preparatory surface treatment selected from pickling, blasting, impact plating with zinc or a zinc alloy, metal plating, soft nitriding, composite metal plating, phosphating, oxalate treatment, and borate treatment in order to roughen the surfaces. Also in this case, due to the anchor effect, the adhesion of the lower solid lubricating coating to the contact surfaces can be strengthened, and it becomes difficult for peeling of the solid lubricating coating to take place, leading to a further improvement in galling resistance.

The thickness of each of the solid lubricating coating and solid corrosion protective coating is preferably 5-40 µm. This is sufficient to impart an adequate corrosion preventing effect, excellent galling resistance, and airtightness to a threaded joint for steel pipes.

BEST MODE FOR CARRYING OUT THE INVENTION

Figure 1:
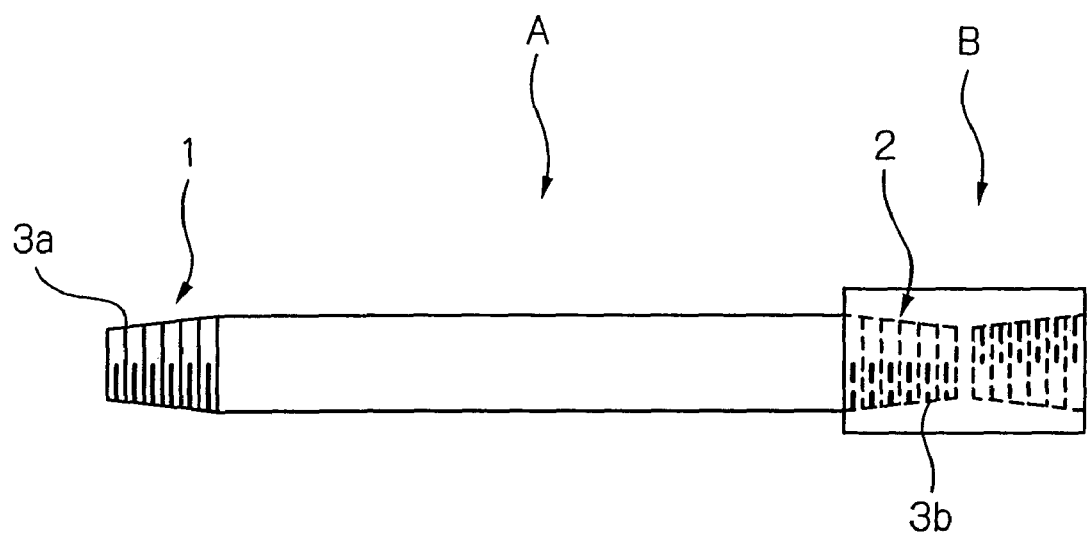
FIG. 1 schematically shows the assembled structure of a steel pipe and a coupling at the time of shipment of the steel pipe.

The present invention will be explained with respect to embodiments shown in the drawings.

(Assembled Structure of a Threaded Joint)

FIG. 1 schematically illustrates the assembled structure of a typical threaded joint showing the state of a steel pipe for an OCTG and a coupling at the time of shipment. A steel pipe A has at both of its ends a pin 1 having an externally threaded portion 3a formed on its outer surface, and a coupling (a threaded connecting member) B has on both sides a box 2 having an internally threaded portion 3b formed on its inner surface. One of the boxes of the coupling B is connected to one of the pins of the pipe A. Although not shown in the drawing, a protector is usually mounted on the other pin of the steel pipe A and also on the other box of the coupling B prior to shipment in order to protect the contact surfaces of these unconnected pin and box. These protectors are removed prior to use of the threaded joint.

Figure 2:
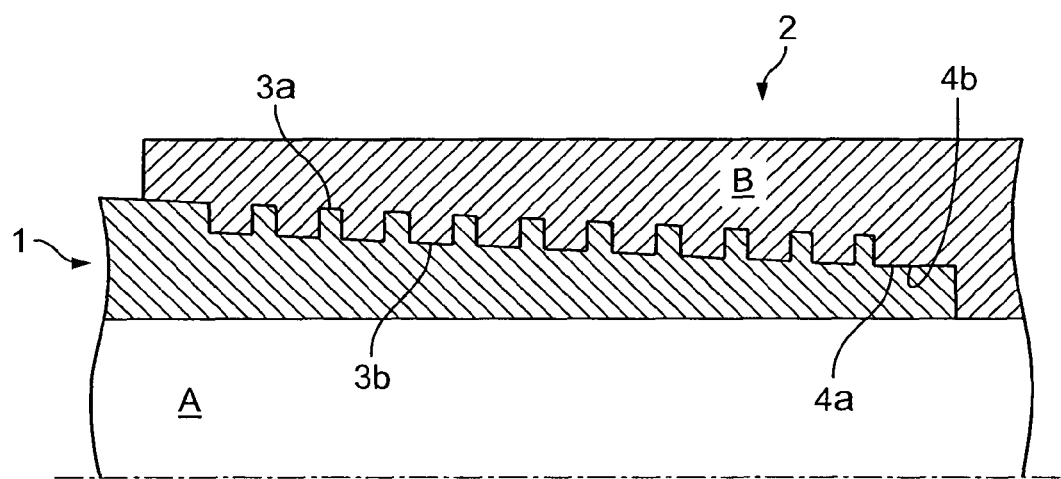
FIG. 2 schematically shows the connecting portions of a threaded joint for steel pipes.

FIG. 2 schematically shows the structure of a representative threaded joint for steel pipes (referred to below simply as a "threaded joint"). The threaded joint is constituted by a pin 1 formed on the outer surface of the end of a steel pipe A and a box 2 formed on the inner surface of a coupling B. The pin 1 has an externally threaded portion 3a and an unthreaded metal-to-metal contact portion 4a which is positioned at the end of the steel pipe. Corresponding thereto, the box 2 has an internally threaded portion 3b and an unthreaded metal-to-metal contact portion 4b positioned on the inner side of the threaded portion 3b.

The threaded portions 3a and 3b and the unthreaded metal-to-metal contact portions 4a and 4b of the pin 1 and the box 2, respectively, are the contact surfaces of the threaded joint. These contact surfaces are required to have galling resistance, airtightness, and corrosion prevention. In the past, for this purpose, a compound grease containing heavy metal powders was applied, or a solid lubricating coating was formed on the contact surfaces. However, as stated earlier, both of these prior-art techniques had problems in actual use due to harmful effects on humans and the environment or due to a decrease in performance including galling resistance during shipment and storage.

According to the present invention, a lower layer in the form of a solid lubricating coating and an upper layer in the form of a solid corrosion protective coating are formed on the contact surfaces of at least one of the pin 1 and the box 2. The solid lubricating coating may be the same as used in the prior art and contain one or more types of lubricating powder in a resin. The solid corrosion protective coating is a nonporous homogeneous coating which does not contain solid particles, and it serves as a barrier for protecting the underlying solid lubricating coating.

As described earlier, at the time of fastening, the upper corrosion protective coating gradually wears due to friction to expose the lower solid lubricating coating, thereby allowing the solid lubricating coating to exhibit its lubricating action sufficiently. Therefore, in spite of the presence of the upper protective coating atop the solid lubricating coating, excellent galling resistance can be imparted to a threaded joint in an unlubricated state without application of a compound grease. In addition, due to the barrier function of the upper corrosion protective layer, even if the inner and outer surfaces of a steel pipe is coated with a rust preventive oil or liquid at the time of shipment or they are exposed to condensed water or rainwater during shipment and storage, the liquid or water cannot permeate into the lower solid lubricating coating through the upper nonporous protective coating, and a decrease in performance during shipment or storage caused by this permeation is avoided.

(Roughening of the Contact Surfaces)

The contact surfaces of at least one of the pin and the box on which a lower layer of a solid lubricating coating and an upper layer of a solid corrosion protective coating are formed according to the present invention are preferably subjected to preparatory surface treatment for surface roughening so that the surface roughness Rmax is larger than the surface roughness obtained by machine grinding (3-5 μm) in order to ensure that the solid lubricating coating formed thereon has good adhesion. However, the object of the present invention can be achieved even if the solid lubricating coating and the solid corrosion protective coating are formed without preparatory surface treatment for roughening the contact surfaces.

FIG. 3 shows two modes of roughening the contact surfaces.

Figure 3A:
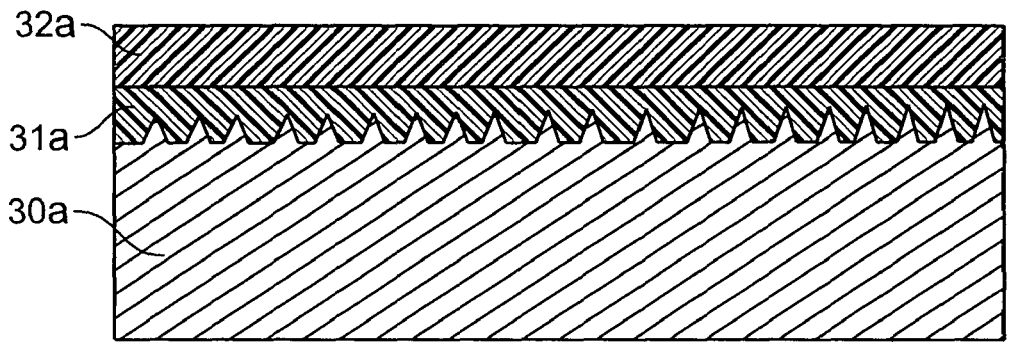
FIGS. 3(a) and 3(b) are explanatory views showing two modes of surface roughening of a contact surface.

In a first mode of surface roughening shown in FIG. 3(a), the surface of a steel 30a itself is roughened by preparatory surface treatment, and a solid lubricating coating 31a and a solid corrosion protective coating 32a are formed in sequence directly atop it. This mode of surface roughening can be achieved by blasting in which a blasting material such as shot having a spherical shape or grit having an angular shape is projected against the surface, or by pickling in which the surface is immersed in a strong acid such as sulfuric acid, hydrochloric acid, nitric acid, or hydrofluoric acid.

Figure 3B:
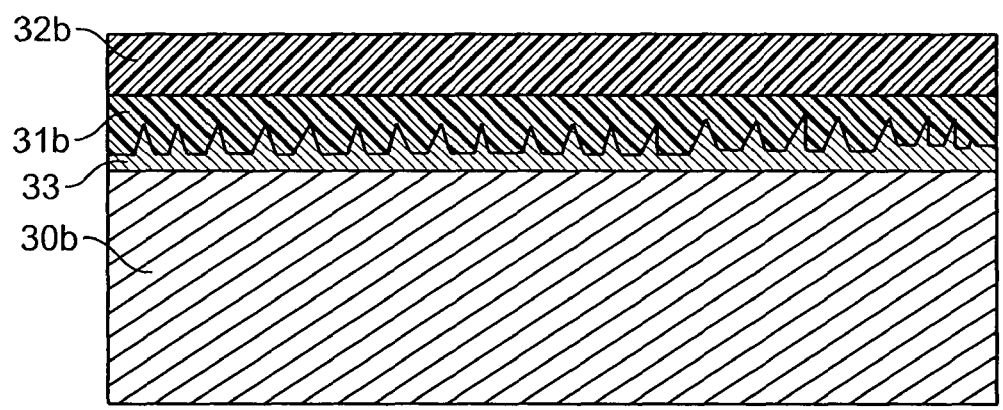

In a second mode of surface roughening shown in FIG. 3(b), an undercoating primary layer 33 having a rough surface is formed by preparatory surface treatment atop the surface of a steel 30b, and a solid lubricating coating 31b and a solid corrosion protective coating 32b are formed in sequence atop the primary layer. Thus, the primary layer 33 is disposed between the contact surface of the steel 30b and the solid lubricating coating 31b. Examples of preparatory surface treatment to form a primary layer are chemical conversion treatment such as phosphate treatment (phosphating), oxalate treatment, and borate treatment (the surface roughness increases with the growth of the crystals which are formed by the chemical conversion treatment), metal plating such as copper plating or iron plating (projections are preferentially plated, so the surface becomes slightly rougher), impact plating with zinc or a zinc alloy which forms a porous zinc or zinc-alloy coating, soft nitriding which forms a nitride layer (such as tufftriding), and composite metal plating which forms a porous coating containing fine solid particles dispersed in a metal matrix.

In either of the first and second modes of roughening the contact surfaces, the surface roughness Rmax obtained by the preparatory surface treatment is preferably in the range of 5-40 μm. If Rmax is less than 5 μm, the adhesion of the solid lubricating coating to the surface and the ability of the surface to hold a coating may become inadequate. If Rmax exceeds 40 μm, the friction of the surface increases, and the solid lubricating coating may not withstand the shearing forces and compressive forces which the coating receives when a high pressure is applied to the surface during fastening, thereby easily causing the breakdown or peeling of the solid lubricating coating. Two or more types of preparatory surface treatment may be carried out for surface roughening.

From the standpoint of the adhesion of a solid lubricating coating, a porous coating, and particularly a coating formed by phosphating (e.g., treatment with manganese phosphate, zinc phosphate, iron-manganese phosphate, or zinc-calcium phosphate) or a zinc or zinc-iron alloy coating formed by impact plating is preferred. The most preferred from the standpoint of adhesion is a manganese phosphate coating. From the standpoint of corrosion prevention, a porous zinc or zinc-iron alloy coating is most preferred since zinc can be expected to provide a sacrificial corrosion preventing ability.

Both a coating formed by phosphating and a zinc or zinc-iron alloy coating formed by impact plating are porous. Therefore, a solid lubricating coating formed atop such a coating has an increased adhesion by the so-called "anchor effect". As a result, it becomes difficult for peeling of the solid lubricating coating to occur even if fastening and loosening are repeated, and direct contact between metal surfaces is effectively prevented, thereby contributing to improvement in galling resistance, airtightness, and corrosion prevention.

Phosphating can be carried out by immersion or spraying in a conventional manner using an acidic phosphating solution which is commonly used for a zinc plated steel material. By way of example, a zinc phosphate-type phosphating solution which contains 1-150 g/L of phosphate ions, 3-70 g/L of zinc ions, 1-100 g/L of nitrate ions, and 0-30 g/L of nickel ions can be used. Another example which can be used is a manganese phosphate-type phosphating solution which is conventionally used for threaded joints. The temperature of the solution during treatment can be from room temperature to 100° C. The duration of treatment may be set depending on the desired coating thickness to be formed, and it is normally up to 15 minutes. In order to promote the formation of a phosphate coating, the surface to be treated may be pretreated with an aqueous solution containing colloidal titanium for surface modification prior to phosphating. After phosphating, it is preferable to perform rinsing with water or warm water followed by drying.

Impact plating can generally be carried out by impacting particles for plating against a material to be plated, and it includes mechanical plating in which the plating particles and the material to be plated are allowed to impinge in a rotating barrel and blast plating in which a blasting device is used to blow the plating particles against the material to be plated. In the present invention, since only the contact surfaces are plated, it is preferable to use blast plating by which localized plating is possible.

Blast plating can be performed using, for example, plating particles having an iron-based core coated with a surface layer of zinc or a zinc alloy as blasting particles which are impacted against the contact surfaces of a pin and/or box to be plated. The amount of the surface layer of zinc or a zinc alloy in the particles is preferably in the range of 20-60 wt %, and the diameter of the particles is preferably in the range of 0.2-1.5 mm. Such particles can be prepared by a method in which an iron or iron alloy powder forming the core is plated with zinc or a zinc alloy (such as a Zn—Fe—Al alloy) and then heat treated to form an iron-zinc alloy layer at the interface between the core and the plating, or by a mechanical alloying method. An example of a commercially available product of such particles is "Z Iron" manufactured by Dowa Iron Powder Co., Ltd. Examples of a blasting device which can be used include a high pressure fluid blasting device which blows particles using a high pressure fluid such as compressed air, and a mechanical blasting device which utilizes an impeller or other rotating vanes.

When the above-described particles are blasted against a substrate to be plated such as a contact surface of a threaded joint, only the surface layers of zinc or a zinc alloy of the particles adheres to the substrate individually so that a porous coating of zinc or a zinc alloy is formed on the substrate. This blast plating technique can form a plated coating having good adhesion to the steel surface regardless of the composition of the steel.

From the standpoints of corrosion prevention and adhesion, the thickness of the zinc or zinc alloy layer formed by impact plating is preferably 5-40 μm. If it is less than 5 μm, adequate corrosion resistance is not guaranteed in some cases. On the other hand, if it exceeds 40 μm, adhesion to the solid lubricating coating tends to decrease.

Even if another method is used for preparatory surface treatment, surface treatment is carried out so as to form a primary coating having a surface roughness Rmax in the range of 5-40 μm.

(Solid Lubricating Coating)

A solid lubricating coating in the present invention is a coating comprising one or more types of solid lubricant powder and a binder as a matrix. Namely, it is a heterogeneous coating containing a solid lubricant powder bonded with a binder.

The solid lubricant powder is a powder exhibiting a lubricating effect and can be formed from materials which have conventionally been used as solid lubricants. A material which does not have an adverse effect on the environment is preferred as the lubricating powder.

Examples of preferred lubricating powders includes inorganic powders of a material having a graphite-type layered crystal structure such as molybdenum disulfide ($MoS_2$), tungsten disulfide ($WS_2$), graphite, and boron nitride (BN), as well as polytetrafluoroethylene powder. The average particle diameter of the lubricating powder is preferably in the range of 0.5-15 μm.

The amount of solid lubricating powder in the solid lubricating coating (the total amount when using two or more types of powder) is preferably selected such that the mass ratio of the solid lubricating powder to the binder in the coating is in the range of 0.3-0.9. If the amount of the lubricating powder is too small, galling resistance decreases, and if it is too large, the adhesion and coating strength of the solid lubricating coating decrease. In the present invention, since the solid lubricating coating is overlaid with a solid corrosion protective coating, compared to the case in which the solid lubricating coating is the outermost layer, the content of the lubricating powder in a solid lubricating coating can be increased.

The solid lubricating coating can contain one or more types of additional powders other than a solid lubricating powder. Examples of such powders are zinc, copper, nickel, tin, or other metal powders and silica or other inorganic powders each for increasing corrosion resistance. When other powders are contained, the mass ratio of the total amount of the other powders and the lubricating powder to the amount of the binder is preferably at most 0.9.

The binder of the solid lubricating coating is a material having the ability to form a film. It can be an organic resin or an inorganic polymeric compound. As the binder, the same sort of material as used for the material constituting the upper solid corrosion protective coating can be used, as described below more fully.

The thickness of the solid lubricating coating is preferably at least 5 μm. The lubricating powder contained in the solid lubricating coating spreads over the entire contact surfaces of a threaded joint when it receives a high pressure so that it can exhibit excellent galling resistance. If the thickness of the solid lubricating coating is less than 5 μm, the absolute amount of the lubricating powder present on the contact surfaces becomes too small to exert its lubricating effect adequately. If the thickness of the solid lubricating coating exceeds 40 μm, the amount of tightening which is achieved by interference between male and female threads becomes inadequate, leading to a decrease in airtightness. If the pressure applied during fastening is increased in order to ensure airtightness, there is a concern that problems such as galling and peeling of the coating occur more easily. However, depending upon the geometric shape of the threads, it is possible to make the thickness of the solid lubricating coating greater than 40 μm. From the standpoint of economy and galling resistance, a more preferred thickness of the solid lubricating coating is at least 10 μm and at most 40 μm.

(Materials for the Binder of the Solid Lubricating Coating and the Solid Corrosion Protective Coating)

A film forming material is used for both the binder of the solid lubricating coating and for the solid corrosion protective coating. For either one, an organic resin or an inorganic polymeric compound can be used.

A preferred organic resin is one having heat resistance, a suitable hardness, and a suitable wear resistance. Examples of such an organic resin include thermosetting resins such as epoxy resins, polyimide resins, polyamide-imide resins, polycarbodiimide resins, polyethersulfones, polyetheretherketones, phenolic resins, and furan resins, as well as polyethylene resins, silicone resins, and fluororesins.

A solid lubricating coating or a solid corrosion protective coating can be formed by applying a resin coating composition (a solution or a dispersion of a resin or a resin itself in liquid form) followed by drying. In the case of the solid lubricating coating, prior to application, a lubricating powder is added to the resin coating composition and uniformly dispersed therein.

In order to increase the adhesion of the solid lubricating coating or the solid corrosion protective coating, the application of a resin coating composition is preferably followed by heat setting. The heat setting is preferably performed at a temperature of at least 120° C. and more preferably 150-380° C. The duration of heating is preferably at least 30 minutes and more preferably 30-60 minutes. The heat setting may be carried out after forming the solid lubricating coating and again after forming the solid corrosion protective coating, or it may be carried out only after forming the solid corrosion protective coating.

An inorganic polymeric compound is a compound having a structure in which metal-oxygen bonds such as Ti—O, Si—O, Zr—O, Mn—O, Ce—O, or Ba—O are three-dimensionally cross linked. Such an inorganic polymeric compound can be formed by hydrolysis and condensation of a hydrolyzable metal compound such as a metal alkoxide or a metal chloride. A hydrolyzable metal compound containing a functional group such as an amine or epoxy group as exemplified by a silane coupling agent or a titanate coupling agent can also be used to form the inorganic polymeric compound.

When an inorganic polymeric compound is used, a solid lubricating coating or a solid corrosion protective coating can be formed by application of a solution of the hydrolyzable metal compound or a partial hydrolysate thereof in a solvent, followed by, if necessary, humidifying treatment and/or heating. Naturally, in the case of the solid lubricating coating, a lubricating powder is dispersed in the solution prior to application thereof.

Humidifying treatment may be performed in order to promote the hydrolysis of the hydrolyzable metal compound. It can be carried out by allowing the applied coating to stand in air, preferably in a humidified air having a relative humidity of at least 70%, for a certain period. Preferably humidifying treatment is followed by heating in order to accelerate the hydrolysis of the metal compound and the condensation of the resulting hydrolysate and discharge of the by-products formed by the hydrolysis (an alcohol when the metal compound is a metal alkoxide) and condensation (water), thereby making it possible to form a coating in a short period of time. In addition, the adhesion of the resulting coating is strengthened. The heating is preferably carried out after evaporation of the solvent remaining in the applied coating, and the heating temperature is preferably a temperature in the range of 50-200° C., which is close to the boiling point of the alcohol by-product. Heating in an hot air oven is more effective.

(Solid Corrosion Protective Coating)

The solid corrosion protective coating is a nonporous coating which does not contain any solid particles. Like the binder of the solid corrosion protective coating, it can be formed from a film forming material.

The solid corrosion protective coating is preferably formed essentially of an organic resin. It is also possible to form the solid corrosion protective coating from an inorganic polymeric compound, but a coating formed from an inorganic polymeric compound generally has a greater tendency toward the formation of voids than an organic resin coating and is inferior in corrosion preventing properties.

The solid corrosion protective coating may contain additives other than solid particles. For example, in order to provide the coating with further increased corrosion protective properties, colloidal silica or wax may be added to the resin coating composition which is used to form the solid corrosion protective coating.

When the solid corrosion protective coating is formed substantially entirely or partly of an organic resin, it is preferable that at least part of the binder of the solid lubricating coating be the same resin as used for the solid corrosion protective coating so that the same organic resin is present in the binder of the lower solid lubricating coating and the upper solid corrosion protective coating. As a result, the adhesion of the solid corrosion protective coating to the solid lubricating coating is markedly increased, and the effect of the solid corrosion protect coating on protection of the underlying solid lubricating coating can be most effectively achieved.

The thickness of the solid corrosion protective coating is preferably at least 5 µm. If the solid corrosion protective coating has a thickness of less than 5 µm, it may not provide a satisfactory corrosion preventing effect. If its thickness is larger than 40 µm, for the same reason as stated with respect to the solid lubricating coating, there is a concern that problems occur with respect to airtightness, galling resistance, and coating adhesion. However, depending upon the geometric shape of the threads, it is possible to make the coating thickness greater than 40 µm.

If the total thickness of the solid lubricating coating and the solid corrosion protective coating becomes too large, there is a concern of an adverse effect particularly on airtightness and galling resistance, so the total thickness of these two coating layers is preferably at most 60 µm and more preferably at most 50 µm.

(Portions on Which Coatings are Formed)

The above-described solid lubricating coating and solid corrosion protective coating can be formed on the contact surfaces of one or both of the pin and the box. The object of the present invention can be adequately achieved even if these two coating layers are formed on the contact surfaces of only one member, so it is economical to form these coating layers on only one member of the pin and the box. In this case, the process of forming a coating on the box is easier than on the pin.

When the contact surfaces of only one member of the pin and the box is coated with a solid lubricating coating and a solid corrosion protective coating according to the present invention, the contact surfaces of the other member on which these two coating layers are not formed (which is preferably the pin and which is referred to below as the other member) may be uncoated (bare) or coated with other one or more coatings.

In particular, when a steel pipe and a coupling are assembled by temporarily connecting them at the time of shipment as shown in FIG. 1, even if the contact surfaces of the other member such as the pin are bare, the contact surfaces of a pin to which a box is connected are in intimate contact with the coatings which is formed on the contact surfaces of the box, and rusting of the contact surfaces of the pin can also be prevented by the coatings of the box.

However, a coupling is installed on a steel pipe for OCTG at only one end thereof, while the pin at the other end of the pipe and the box on one side of the coupling are exposed. A protector is often mounted on the exposed pin or box for protecting the threaded portions, but the protector does not prevent the passage of air or water.

Therefore, when a solid lubricating coating and a solid corrosion protective coating according to the present invention are formed only on the box, the pin at one end on which a box is not installed is exposed to air. In this case, in order to impart corrosion preventing properties or both corrosion preventing properties and lubricating properties to the contact surfaces of the other member (i.e., pin), the contact surfaces of the other member can be coated with one or more coating layers by suitable surface treatment. This coating may be either a drying or nondrying coating as long as it is not harmful to the environment or humans.

The coating formed on the contact surfaces of the other member may be any primary coating formed by the above-described preparatory surface treatment which may be performed prior to the formation of a solid lubricating coating according to the present invention. Specifically, it can be selected from a porous zinc or zinc alloy coating formed by impact plating, a plated metal coating, a chemical conversion coating such as a phosphate, an oxalate, or a borate coating. Alternatively, a coating for the other member may be an inorganic ceramic coating. Examples of a ceramic coating are a composite coating of a special ceramic and a special metal such as Tom Coating supplied by Tomoe Works Co., Ltd. and a Raydent Coating which is a metallic coating having a laminated layer of ultrafine ceramic particles supplied by Raydent Industrial Co., Ltd. Another option for such a coating is to form a solid corrosion protective coating as described above directly on the contact surfaces of the other member. Of these coatings, a porous zinc or zinc alloy coating, a plated metal coating, and a solid corrosion protective coating have a good corrosion preventing effect, while the other coatings are highly effective at improving sliding properties.

A plated metal coating for corrosion protection is preferably one having high corrosion preventing properties such as a plated coating of zinc, a zinc alloy, nickel, copper, or a copper-tin alloy. Examples of a phosphate coating are a manganese phosphate coating, a zinc phosphate coating, a zinc-calcium phosphate coating, and a zinc-iron phosphate coating. An oxalate coating can be a coating of a metal oxalate such as iron oxalate ($FeC_2O_4$) and/or nickel oxalate ($NiC_2O_4$) which is formed by immersion in an aqueous solution of oxalic acid ($C_2H_2O_4$). A borate coating can be a coating of a metal borate such as potassium borate. The coating weight of these coatings may be the same as conventionally used for these coatings and can be determined so as to adequately impart corrosion preventing properties and/or lubricating properties without being excessive. It is possible to form two or more layers of these coatings, such as to form a phosphate coating, an oxalate coating, or a borate coating atop a porous zinc or zinc alloy coating or a plated metal coating.

On the contact surfaces of the other member, instead of forming the above-described primary coating or solid corrosion protective coating, it is possible to form solely the same type of solid lubricating coating (a coating containing a lubricating powder in a binder) as is used as a lower coating layer in the present invention. The thickness of a coating on the other member is preferably in the range of 5-40 μm for the same reason stated above. In order to guarantee the durability of the solid lubricating coating and the solid corrosion protective coating formed on the box which the other member (pin) contacts, the surface roughness Rmax of the other member is preferably in the range of 1-10 μm. If the surface roughness of the contact surfaces of the other member (pin) is larger than 10 μm, there is the possibility of the solid corrosion protective coating or the solid lubricating coating formed on the box being damaged and peeled off by the pin at the time of fastening and loosening of a threaded joint.

When forming a solid corrosion protective coating or solid lubricating coating on the contact surfaces of the other member, in order to improve the adhesion of these coatings, any of the above-described preparatory surface treatment for surface roughening can be utilized. Namely, any treatment for roughening the contact surfaces themselves such as pickling or blasting, or treatment for forming a primary coating with a rough surface such as impact plating with zinc or a zinc alloy, metal plating, soft nitriding treatment, composite metal plating, phosphating, oxalate treatment, or borate treatment can be carried out on the contact surfaces of the other member prior to forming a solid corrosion protective coating or a solid lubricating coating. It is also possible to employ two or more type of preparatory surface treatment sequentially.

As described above, it is preferable for the surface roughness Rmax of the contact surfaces of the other member to be at most 10 μm. The preparatory surface treatment for surface roughening of the contact surfaces of the other member is preferably controlled so as to ensure that such a preferable surface roughness is obtained after the solid corrosion protective coating or solid lubricating coating is formed on these surfaces.

EXAMPLES

The following examples are intended to illustrate the present invention and are not intended to limit the invention in any way. In the examples, the contact surfaces including the male threaded portion and the unthreaded metal-to-metal contact portion of the pin will be referred to as the "pin surfaces", and the contact surfaces including the female threaded portion and the unthreaded metal-to-metal contact portion of the box will be referred to as the "box surfaces".

Threaded joints (outer diameter: 17.78 cm (=7 inches), wall thickness: 1.036 cm (=0.408 inches)) for OCTG were produced from a carbon steel A, a Cr—Mo steel B, a 13% Cr steel C, and a high alloy steel D each having the composition shown in Table 1.

The pin and box surfaces of each threaded joint were separately subjected to preparatory surface treatment and then to one or two types of surface treatment each to form a coating as shown in Table 2 and as described later for each example. When only a single coating was formed, the coating was indicated in the column of outermost layer in Table 2. When two types of coating were formed, the first and the second coatings were indicated in the columns of intermediate layer and outermost layer, respectively, in Table 2. In the examples according to the present invention, the intermediate and outer layers are a solid lubricating coating and a solid corrosion protective layer.

In all the examples, each of the solid lubricating coating and the solid corrosion protective coating was formed by air spray coating followed by heat setting which was carried out by heating at a temperature exceeding 100° C. for 30 minutes.

In some examples, in order to evaluate the corrosion resistance when exposed to condensed water and rainwater, after the surface treatment is finished, the box surfaces were subjected to the salt spray test specified in JIS Z2371 for 100 hours. Thereafter, the box surfaces were observed, and a fastening and loosening test was then carried out on the threaded joint.

In the other examples, in order to simulate the conditions during storage of OCTG, after the surface treatment is finished, a commercially-available rust preventive oil was applied to the pin surfaces and the box surfaces of each threaded joint, and the joint was left for one week. Thereafter, the rust preventive oil on the surfaces was wiped off, and after the box surfaces were observed, a fastening and loosening test was carried out on the threaded joint.

Fastening was carried out at a fastening speed of 10 rpm with a fastening torque of 14 kN-m, and the occurrence of seizing or galling of the contact surfaces of the pin and the box after loosening was investigated. When damages due to seizing which occurred during fastening were light and it was possible to resume fastening after repair, repair was carried out and fastening and loosening were continued. When unrepairable severe seizing or galling occurred, the test was terminated.

The test results are shown in Table 3.

TABLE 1

| | (mass %, balance: Fe and inevitable impurities) | | | | | | | |
|---|---|---|---|---|---|---|---|---|
| Steel Type | C | Si | Mn | P | S | Cu | Ni | Cr | Mo |
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |
| D | 0.02 | 0.3 | 0.5 | 0.02 | 0.01 | 0.5 | 7 | 25 | 3.2 |

TABLE 2

| | Pin | | | Box | | | | |
|---|---|---|---|---|---|---|---|---|
| No. | Preparatory treatment | Intermediate layer | Outermost layer | Preparatory treatment | Intermediate layer | Outermost layer | Steel | Condition Aplied* |
| Example 1 | 1. Finish grinding (R = 3) 2. Zn phosphate | None | CP Epoxy resin (t = 20) | 1. Finish grinding (R = 3) 2. Mn phosphate | LU Graphite (M = 0.6) | CP Epoxy resin (t = 20) | A | Rust preventive oil |

TABLE 2-continued

| No. | Pin Preparatory treatment | Pin Intermediate layer | Pin Outermost layer | | Box Preparatory treatment | | Box Intermediate layer | | Box Outermost layer | Steel | Condition Aplied* |
|---|---|---|---|---|---|---|---|---|---|---|---|
| | (R = 10) (t = 15) | | | | (R = 10) (t = 15) | | Cu powder (N = 0.2) (t = 30) | | | | |
| Example 2 | 1. Finish grinding (R = 3) 2. Zn phosphate (R = 10) (t = 15) | None | CP | Epoxy resin (t = 20) | 1. Finish grinding (R = 3) 2. Mn phosphate (R = 10) (t = 15) | LU | Epoxy resin Graphite (M = 0.6) Cu powder (N = 0.2) (t = 30) | CP | Epoxy resin (t = 20) | A | Salt spray |
| Example 3 | 1. Finish grinding (R = 3) 2. Pickling (R = 10) (R = 10) | None | LU | Furan resin Mo disulfide (M = 0.3) (t = 20) | 1. Finish grinding (R = 3) 2. Pickling | LU | Epoxy resin Mo disulfide (M = 0.7) (t = 30) | CP | Epoxy resin (t = 20) | B | Rust preventive oil |
| Example 4 | Sand blasting (R = 10) | None | LU | Furan resin Mo disulfide (M = 0.3) (t = 20) | 1. Finish grinding (R = 3) 2. Zn impact plating (t = 7) | LU | Epoxy resin Mo disulfide (M = 0.7) (t = 30) | CP | Epoxy resin (t = 20) | D | Rust preventive oil |
| Example 5 | Sand blasting (R = 10) | None | CP | Epoxy resin (t = 20) | 1. Finish grinding (R = 3) 2. Zn impact plating (t = 7) | LU | Epoxy resin Mo disulfide (M = 0.7) (t = 30) | CP | Epoxy resin (t = 20) | C | Rust preventive oil |
| Example 6 | Sand blasting (R = 10) | None | LU | Furan resin Mo disulfide (M = 0.3) (t = 20) | 1. Finish grinding (R = 3) 2. Zn impact plating (t = 7) | LU | Epoxy resin Graphite (M = 0.6) Cu powder (N = 0.2) (t = 30) | CP | Epoxy resin (t = 20) | C | Rust preventive oil |
| Comparative Example 1 | Finish grinding (R = 3) | None | | None | 1. Finish grinding (R = 3) 2. Mn phosphate (R = 10) (t = 15) | | None | | Compound grease specified by API Bulletin 5A2** | A | Rust preventive oil |
| Comparative Example 2 | 1. Finish grinding (R = 3) 2. Zn phosphate (R = 10) (t = 15) | None | CP | Epoxy resin (t = 20) | 1. Finish grinding (R = 3) 2. Mn phosphate (R = 10) (t = 15) | CP | Epoxy resin (t = 20) | LU | Epoxy resin Graphite (M = 0.6) Cu powder (N = 0.2) (t = 30) | A | Salt spray |
| Comparative Example 3 | Finish grinding (R = 3) | None | | None | 1. Finish grinding (R = 3) 2. Mn phosphate (R = 10) (t = 15) | | None | LU | Polyamideimide resin Mo disulfide (M = 1) (t = 25) | B | Rust preventive oil |
| Comparative Example 4 | 1. Finish grinding (R = 3) 2. Zn phosphate (R = 10) (t = 15) | None | | None | 1. Finish grinding (R = 3) 2. Mn phosphate (R = 10) (t = 15) | | None | LU | Epoxy resin Graphite (M = 1) (t = 15) | B | Rust preventive oil |
| Comparative Example 5 | 1. Finish grinding (R = 3) 2. Zn phosphate (R = 10) (t = 15) | None | | None | 1. Finish grinding (R = 3) 2. Mn phosphate (R = 10) (t = 15) | CP | Epoxy resin (t = 20) | LU | Polyamideimide resin Mo disulfide (M = 1) (t = 25) | B | Rust preventive oil |

(Notes)
R = surface roughness Rmax (μm);
t = coating thickness (μm);
CP = Corrosion protective coating;
LU = Lubricating coating;
M = mass ratio of lubricating powder to resin binder;
N = mass ratio of copper powder to lubricating powder.
*Condition applied prior to fasstening and loosening test.
**Compound grease contains heavy metals such as lead and is harmful to humans and the environment.

TABLE 3

| No. | Surface appearance of Box before fastening | Result in each cycle of fastening and loosening test* | | | | | | | | | |
|---|---|---|---|---|---|---|---|---|---|---|---|
| | | 1 | 2 | 3 | 4 | 5 | 6 | 7 | 8 | 9 | 10 |
| Example 1 | No change | ○ | ○ | ○ | ○ | ○ | ○ | ○ | ○ | ○ | ○ |
| Example 2 | No change | ○ | ○ | ○ | ○ | ○ | ○ | ○ | ○ | ○ | ○ |
| Example 3 | No change | ○ | ○ | ○ | ○ | ○ | ○ | ○ | ○ | ○ | ○ |
| Example 4 | No change | ○ | ○ | ○ | ○ | ○ | ○ | ○ | ○ | ○ | Δ |
| Example 5 | No change | ○ | ○ | ○ | ○ | ○ | ○ | ○ | ○ | ○ | Δ |
| Example 6 | No change | ○ | ○ | ○ | ○ | ○ | ○ | ○ | Δ | Δ | Δ |
| Comparative Example 1 | — | ○ | ○ | ○ | ○ | ○ | ○ | ○ | ○ | Δ | Δ |
| Comparative Example 2 | Patina formed on the surface | ○ | ○ | ○ | ○ | ○ | Δ | Δ | X | — | — |
| Comparative Example 3 | No change | ○ | ○ | ○ | Δ | Δ | X | — | — | — | — |
| Comparative Example 4 | No change | ○ | Δ | X | — | — | — | — | — | — | — |
| Comparative Example 5 | No change | ○ | ○ | ○ | Δ | Δ | X | — | — | — | — |

*○: No occurrence of seizing and galling;
Δ: Light seizing occurred but refastening was possible after repair;
X: Galling occurred and repair was not possible.

Example 1

The pin and box surfaces of a carbon steel threaded joint having composition A shown in Table 1 were separately subjected to the following surface treatment.

The box surfaces which had been finished by machine grinding (surface roughness of 3 μm) were immersed for 10 minutes in a manganese phosphating solution (a manganese phosphate-type phosphating solution) at 80-95° C. for preparatory surface treatment to form a primary coating which was a manganese phosphate coating with a thickness of 15 μm. On the primary coating, a solid lubricating coating with a thickness of 30 μm was formed from an epoxy resin containing graphite powder with an average particle diameter of 10 μm and copper flaky powder with a maximum length of 15 μm. The mass ratio of graphite to epoxy resin (M in Table 2) in the solid lubricating coating was 0.6:1, and the mass ratio of copper powder to graphite (N in Table 2) therein was 0.2:1. A solid corrosion protective coating formed solely of an epoxy resin was formed to a thickness of 20 μm atop the solid lubricating coating. The pin surfaces which had been finished by machine grinding (surface roughness of 3 μm) were immersed for 10 minutes in a zinc phosphating solution (a zinc phosphate-type phosphating solution) at 75-85° C. for preparatory surface treatment to form a primary coating which was a zinc phosphate coating with a thickness of 15 μm. A solid corrosion protective coating having a thickness of 20 μm and consisting solely of an epoxy resin was then formed directly atop the primary coating.

Upon observation of the box surfaces to which a rust preventive oil had been applied and then wiped off, no change in the surface appearance was found. In the fastening and loosening test, as shown in Table 3, there was no occurrence of seizing is or galling during 10 cycles of fastening and loosening, and the results were extremely good.

Example 2

The pin and box surfaces of a carbon steel threaded joint having composition A shown in Table 1 were separately subjected to surface treatment exactly in the same manner as described in Example 1.

Thus, the box surfaces had an innermost manganese phosphate coating, an intermediate solid lubricating coating containing graphite powder and copper powder in an epoxy resin, and an outermost solid corrosion protective coating of an epoxy resin. The pin surfaces had a lower zinc phosphate coating and an upper solid corrosion protective coating of an epoxy resin.

The box surfaces were exposed to the salt spray test. Upon observation of the box surfaces after the salt spray test for 100 hours, no change in the surface appearance was found. In the fastening and loosening test, as shown in Table 3, there was no occurrence of seizing or galling during 10 cycles of fastening and loosening, and the results were extremely good.

Example 3

The pin and box surfaces of a threaded joint made of the Cr—Mo steel having composition B in Table 1 were separately subjected to the following surface treatment.

The box surfaces which had been finished by machine grinding (surface roughness of 3 μm) were subjected to pickling for preparatory surface treatment to obtain a surface roughness of 10 μm. On the box surfaces which had been treated in this manner, a solid lubricating coating with a thickness of 30 μm was formed from an epoxy resin containing molybdenum disulfide powder with an average particle diameter of 5 μm. The mass ratio M of molybdenum disulfide to epoxy resin in the solid lubricating coating was 0.7:1. A solid corrosion protective coating formed solely of epoxy resin was formed to a thickness of 20 μm atop this solid lubricating coating.

The pin surfaces which had been finished by machine grinding (surface roughness of 3 μm) were subjected to pickling for preparatory surface treatment to obtain a surface roughness of 10 μm. On the pin surfaces which had been treated in this manner, a solid lubricating coating with a thickness of 20 μm was formed from a furan resin containing molybdenum disulfide powder with an average particle diameter of 5 μm. The mass ratio M of molybdenum disulfide to furan resin in the solid lubricating coating was 0.3:1. No solid corrosion protective coating formed solely of epoxy resin was formed thereon.

Upon observation of the box surfaces to which a rust preventive oil had been applied and then wiped off, no change in the surface appearance was found. In the fastening and loosening test, as shown in Table 3, there was no occurrence of seizing or galling during 10 cycles of fastening and loosening, and the results were extremely good.

Example 4

The pin and box surfaces of on a threaded joint made of the high alloy steel having composition D shown in Table 1 were separately subjected to the following surface treatment.

The box surfaces which had been finished by machine grinding (surface roughness of 3 μm) were subjected as preparatory surface treatment to blast plating using particles having an iron core coated with zinc to form a porous zinc coating having a thickness of 7 μm. On the resulting primary coating, a solid lubricating coating having a thickness of 30 μm was formed from an epoxy resin containing molybdenum disulfide powder with an average particle diameter of 5 μm. The mass ratio M of molybdenum disulfide to epoxy resin in the solid lubricating coating was 0.7:1. A solid corrosion protective coating consisting solely of an epoxy resin and having a thickness of 20 μm was formed atop this solid lubricating coating.

The pin surfaces were given a surface roughness of 10 μm by sandblasting with #80 sand, and a solid lubricating coating with a thickness of 20 μm was formed on these surfaces from a furan resin containing molybdenum disulfide powder with an average particle diameter of 5 μm. The mass ratio M of molybdenum disulfide to furan resin in the solid lubricating coating was 0.3:1.

Upon observation of the box surfaces to which a rust preventive oil had been applied and then wiped off, no change in the surface appearance was found. In the fastening and loosening test, as shown in Table 3, during 10 cycles of fastening and loosening, light seizing occurred at the completion of the tenth cycle, but it was possible to continue its use by performing repair. This result does not pose any problems at all with respect to galling resistance.

Example 5

The pin and box surfaces of a threaded joint made of the 13Cr steel having composition C shown in Table 1 were separately subjected to the following surface treatment.

The box surfaces which had been finished by machine grinding (surface roughness of 3 μm) were surface treated exactly in the same manner as described in Example 4. Thus, a porous zinc coating formed by blast plating, a solid lubricating coating containing molybdenum disulfide powder in an epoxy resin, and a solid corrosion protective coating of an epoxy resin were sequentially formed on the box surfaces.

The pin surfaces were given a surface roughness of 10 μm by sandblasting using #80 sand, and a solid corrosion protective coating having a thickness of 20 μm and consisting solely of an epoxy resin was formed on these surfaces.

Upon observation of the box surfaces to which a rust preventive oil had been applied and then wiped off, no change in the surface appearance was found. In the fastening and loosening test, as shown in Table 3, during 10 cycles of fastening and loosening, light seizing occurred at the completion of the tenth cycle, but it was possible to continue use by performing repair. This result poses absolutely no problems from the standpoint of galling resistance.

Example 6

The pin and box surfaces of a threaded joint made of the 13Cr steel having composition C shown in Table 1 were separately subjected to the following surface treatment.

The box surfaces which had been finished by machine grinding (surface roughness of 3 μm) were subjected for preparatory surface treatment to blast plating using particles having an iron core coated with zinc to form a porous zinc coating having a thickness of 7 μm. On the resulting primary coating, a solid lubricating coating with a thickness of 30 μm and containing graphite powder with an average particle diameter of 10 μm and copper flaky powder with a maximum length of 15 μm in an epoxy resin was formed. The mass ratio M of graphite to epoxy resin in the solid lubricating coating was 0.6:1, and the mass ratio N of copper powder to graphite therein was 0.2:1. A solid corrosion protective coating with a thickness of 20 μm and consisting solely of an epoxy resin was formed atop this solid lubricating coating.

The pin surfaces were given a surface roughness of 10 μm by sandblasting with #80 sand, and then a solid lubricating coating with a thickness of 20 μm and containing molybdenum disulfide powder in a furan resin with an average particle diameter of 5 μm was formed on these surfaces. The mass ratio M of molybdenum disulfide to furan resin in the solid lubricating coating was 0.3:1.

Upon observation of the box surfaces to which a rust preventive oil had been applied and then wiped off, no change in the surface appearance was found. In the fastening and loosening test, as shown in Table 3, during 10 cycles of fastening and loosening, light seizing occurred from the eighth cycle, but with repair, fastening and loosening could be performed for up to ten cycles. This result presents no problems with respect to galling resistance.

Comparative Example 1

The pin and box surfaces of a carbon steel threaded joint having composition A shown in Table 1 were separately subjected to the following surface treatment.

The box surfaces which had been finished by machine grinding (surface roughness of 3 μm) were immersed for 10 minutes in a manganese phosphating solution at 80-95° C. for preparatory surface treatment to form a manganese phosphate coating with a thickness of 15 μm. A compound grease meeting API standards was then applied as a lubricant.

The pin surfaces which had been finished by machine grinding (surface roughness of 3 μm) remained as they were without further surface treatment.

In the fastening and loosening test, as shown in Table 3, during 10 cycles of fastening and loosening, there was no occurrence of seizing or galling up to the eighth cycle. Although light seizing occurred on the ninth cycle, repair was performed, and fastening and loosening could be performed for up to 10 cycles. Thus, in this example, considerably good galling resistance was obtained, but it should be understood that the use of a compound grease containing a large amount of heavy metals including lead is harmful to humans and the environment.

Comparative Example 2

The pin and box surfaces of a carbon steel threaded joint having composition A shown in Table 1 were separately subjected to the same surface treatment as described in Example 1 except that the order of the formation of the solid lubricating coating and the solid corrosion protective coating for the box surfaces was reversed as described below.

Thus, the box surfaces which had been finished by machine grinding (surface roughness of 3 μm) were immersed for 10 minutes in a manganese phosphating solution at 80-95° C. for preparatory surface treatment to form a manganese phosphate coating with a thickness of 15 μm. On the resulting primary coating, a solid corrosion protective coating formed solely of an epoxy resin was formed to a thickness of 20 μm as an intermediate layer. On this layer, a solid lubricating coating with a thickness of 30 μm was formed from an epoxy resin containing graphite powder with an average particle diameter of 10 μm and copper flaky powder with a maximum length of 15 μm. The mass ratio M of graphite to epoxy resin in the solid lubricating coating was 0.6:1, and the mass ratio N of copper powder to graphite therein was 0.2:1. The structure of these coatings was similar to one proposed in WO 2004/033951 in that it had a lower solid corrosion protective coating and an upper solid lubricating coating.

The pin surfaces which had been finished by machine grinding (surface roughness of 3 μm) were subjected to surface treatment exactly in the same manner as described in Example 1, and they had a lower zinc phosphate coating with a thickness of 15 μm and an upper solid corrosion protective coating having a thickness of 20 μm and consisting solely of an epoxy resin.

The box surfaces were exposed to the salt spray test for 100 hours. Upon observation of the box surfaces after the salt spray test, the occurrence of patina (verdigris) was found on the box surfaces. It is believed that the patina was formed by reacting the copper powder contained in the solid lubricating coating, which was the outermost layer in this example, with the oxygen in air in a humid atmosphere given by the salt spray test.

In the fastening and loosening test, as shown in Table 3, during 10 cycles of fastening and loosening, there was no occurrence of seizing or galling up to the fifth cycle, but light seizing occurred on the sixth cycle. After repair was performed, fastening and loosening were continued up to the seventh cycle, but severe seizing or galling occurred on the eighth cycle.

Comparative Example 3

The pin and box surfaces of a threaded joint made of the Cr—Mo steel having composition B in Table 1 were separately subjected to the following surface treatment.

The box surfaces which had been finished by machine grinding (surface roughness of 3 μm) were immersed for 10 minutes in a manganese phosphating solution at 80-95° C. for preparatory surface treatment to form a manganese phosphate coating with a thickness of 15 μm. On the resulting primary coating, a solid lubricating coating having a thickness of 25 μm and containing molybdenum disulfide powder with an average particle diameter of 5 μm in a polyamide-imide resin was formed. The mass ratio M of molybdenum disulfide to polyamide-imide resin in the solid lubricating coating was 1:1. No solid corrosion protective coating was formed thereon.

The pin surfaces which had been finished by machine grinding (surface roughness of 3 μm) remained as they were without further surface treatment.

Upon observation of the box surfaces to which a rust preventive oil had been applied and then wiped off, no change in the surface appearance was found. In the fastening and loosening test, as shown in Table 3, during 10 cycles of fastening and loosening, there was no occurrence of seizing or galling up to the third cycle, but light seizing occurred on the fourth cycle. After repair was performed, fastening and loosening were continued up to the fifth cycle, but severe seizing or galling occurred on the sixth cycle.

Comparative Example 4

The pin and box surfaces of a threaded joint made of the Cr—Mo steel having composition B in Table 1 were separately subjected to the following surface treatment.

The box surfaces which had been finished by machine grinding (surface roughness of 3 μm) were immersed for 10 minutes in a manganese phosphating solution at 80-95° C. to form a manganese phosphate coating with a thickness of 15 μm. On the resulting primary coating, a solid lubricating coating with a thickness of 15 μm and containing graphite powder with an average particle diameter of 10 μm in an epoxy resin was formed. The mass ratio M of graphite to epoxy resin in the solid lubricating coating was 1:1. No solid corrosion protective coating was formed thereon.

The pin surfaces which had been finished by machine grinding (surface roughness of 3 μm) were immersed for 10 minutes in a zinc phosphating solution at 75-85° C. for preparatory surface treatment to form a zinc phosphate coating with a thickness of 15 μm.

Upon observation of the box surfaces to which a rust preventive oil had been applied and then wiped off, no change in the surface appearance was found. In the fastening and loosening test, as shown in Table 3, during 10 cycles of fastening and loosening, seizing or galling did not occur on the first cycle, but light seizing occurred on the second cycle. After repair was performed, fastening and loosening were continued, but severe seizing or galling occurred on the third cycle.

Comparative Example 5

The pin and box surfaces of a threaded joint made of the Cr—Mo steel having composition B in Table 1 were separately subjected to the following surface treatment.

The box surfaces which had been finished by machine grinding (surface roughness of 3 μm) were immersed for 10 minutes in a manganese phosphating solution at 80-95° C. for preparatory surface treatment to form a manganese phosphate coating with a thickness of 15 μm. On the resulting primary coating, a solid corrosion protective coating with a thickness of 20 μm and made solely from an epoxy resin was formed. On the solid corrosion protective coating, a solid lubricating coating which had a thickness of 25 μm and was made from a polyamide-imide resin containing molybdenum disulfide powder with an average particle diameter of 5 μm was formed. The mass ratio M of molybdenum disulfide to the polyamide-imide resin in the solid lubricating coating was 1:1. The structure of these coatings having a lower solid corrosion protective coating and an upper solid lubricating coating is the same as proposed in WO 2004/033951.

The pin surfaces which had been finished by machine grinding (surface roughness of 3 μm) were immersed for 10 minutes in a zinc phosphating solution at 75-85° C. for preparatory surface treatment to form a zinc phosphate coating with a thickness of 15 μm.

Upon observation of the box surfaces to which a rust preventive oil had been applied and then wiped off, no change in the surface appearance was found. In the fastening and loosening test, as shown in Table 3, during 10 cycles of fastening and loosening, seizing or galling did not occur up to the third cycle, but light seizing occurred on the fourth cycle. After repair was performed, fastening and loosening were continued up to the fifth cycle, but severe seizing or galling occurred on the sixth cycle.

The present invention has been explained with respect to embodiments which are considered preferred at the present time, but the present invention is not limited to the embodiments described above. It should be understood that modifications and variations can be made within a range which is not contrary to the technical concept of the invention which can be comprehended from the appended claims and the overall specification and that a threaded joint for steel pipes including such a modification or variation falls within the technical scope of the present invention.

The invention claimed is:

1. A threaded joint for steel pipes comprising a pin and a box having respective contact surfaces which contact each other when the joint is fastened, characterized in that the contact surface of at least one of the pin and the box includes an impact plating coating of zinc or a zinc alloy on one of the contact surfaces, and wherein the impact plating coating is coated with a solid lubricating coating comprising a solid lubricating powder and a binder, and formed atop the solid lubricating coating is a solid corrosion protective coating which does not contain solid particles.

2. A threaded joint for steel pipes as set forth in claim 1 wherein the contact surface of the box is coated with the solid lubricating coating and the solid corrosion protective coating.

3. A threaded joint for steel pipes as set forth in claim 1 wherein the impact plating coated contact surface of one member of the pin and the box is coated with the solid lubricating coating and the solid corrosion protective coating, and the contact surface of the other member is coated with at least one layer of a coating selected from a zinc or zinc alloy coating, a metal plated coating, a phosphate coating, an oxalate coating, a borate coating, and either the solid lubricating coating or the solid corrosion protective coating.

4. A threaded joint for steel pipes as set forth in claim 1 wherein the impact plating coated contact surface of one member of the pin and the box is coated with the solid lubricating coating and the solid corrosion protective coating, and the contact surface of the other member is surface treated by pickling, blasting, impact plating with zinc or a zinc alloy, metal plating, soft nitriding, composite metal plating, phosphating, oxalate treatment, and borate treatment, and then the surface treated contact surface is coated with either the solid lubricating coating or the solid corrosion protective coating.

5. A threaded joint for steel pipes as set forth in claim 1 wherein the solid corrosion protective coating consists essentially of an organic resin.

6. A threaded joint for steel pipes as set forth in claim 1 wherein the binder of the solid lubricating coating comprises an organic resin, and the solid corrosion protective coating comprises the same organic resin as does the binder.

7. A threaded joint for steel pipes as set forth in claim 1 wherein the thickness of the solid lubricating coating is 5-40 μm.

8. A threaded joint for steel pipes as set forth in claim 1 wherein the thickness of the solid corrosion protective coating is 5-40 μm.

9. A threaded joint for steel pipes as set forth in claim 1 wherein the total coating thickness of the solid lubricating coating and the solid corrosion protective coating is at most 60 μm.

* * * * *